Figure 1:
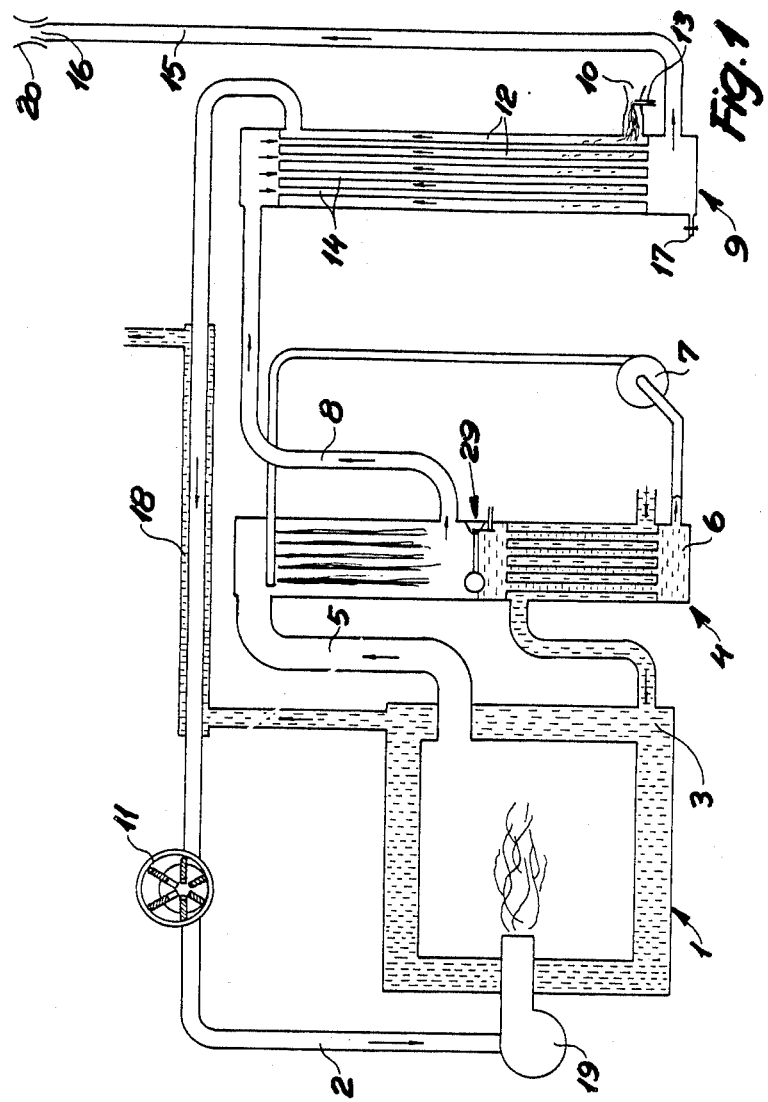

United States Patent [19]

Olrik

[11] Patent Number: 4,580,530

[45] Date of Patent: Apr. 8, 1986

[54] METHOD IN THE OPERATION OF A FIRING PLANT, AND A FIRING PLANT FOR PERFORMING THE METHOD

[76] Inventor: Henrik G. Olrik, Bakkegaardsvej 413, DK-3050 Humleback, Denmark

[21] Appl. No.: 598,386

[22] Filed: Apr. 9, 1984

[30] Foreign Application Priority Data

Apr. 11, 1983 [DK] Denmark .............. 1581/83

[51] Int. Cl.⁴ .................................. F22B 33/00
[52] U.S. Cl. .................. 122/1 A; 110/302; 122/DIG. 1; 122/DIG. 2; 431/215
[58] Field of Search .......... 122/1 A, DIG. 1, DIG. 2; 431/4, 215; 110/302

[56] References Cited

U.S. PATENT DOCUMENTS

| | | | |
|---|---|---|---|
| 3,971,847 | 7/1976 | Houseman | 431/4 X |
| 4,173,450 | 11/1979 | Schrank | 431/4 X |
| 4,372,487 | 2/1983 | Hollister | 122/20 B X |

FOREIGN PATENT DOCUMENTS

| | | |
|---|---|---|
| 347480 | 1/1922 | Fed. Rep. of Germany . |
| 393251 | 3/1924 | Fed. Rep. of Germany . |
| 2512233 | 9/1976 | Fed. Rep. of Germany . |
| 1602409 | 11/1970 | France . |
| 2210277 | 6/1974 | France . |
| 2515321 | 4/1983 | France . |
| 148723 | 8/1931 | Switzerland . |

Primary Examiner—Edward G. Favors
Attorney, Agent, or Firm—Henry Sternberg; Bert J. Lewen

[57] ABSTRACT

In a method in the operation of a firing plant of the type comprising a combustion furnace and heat exchanger means to transfer thermal energy from the flue gas of the furnace to its combustion air, wherein a vaporizable liquid, such as water, is added to the combustion air of the furnace, the combustion air pressure is reduced in the portion of the heat exchanger means where the said liquid is caused to evaporate, the necessary evaporation heat being taken from the flue gas of the furnace before the flue gas is discharged to the atmosphere. A plant for performing the method is characterized by containing a pump (11) which has a relatively small inlet opening (10) so that the pump (11) creates a negative pressure in the portion (12) of the heat exchanger (9) where the liquid, fed by means of a nozzle (13), evaporates. This allows large amounts of water to evaporate, and flue gas, which flows through the heat exchanger portion (14), is cooled to a low temperature. The flue gas will then condense, and this procedure is accelerated by the constriction (at 16) of the flue (15) so that there is a positive pressure in the heat exchanger portion (14). According to the heat pump principle, the advantages are an unprecented low temperature level and humidity content of the discharged flue gas and a correspondingly high efficiency of the firing plant.

15 Claims, 4 Drawing Figures

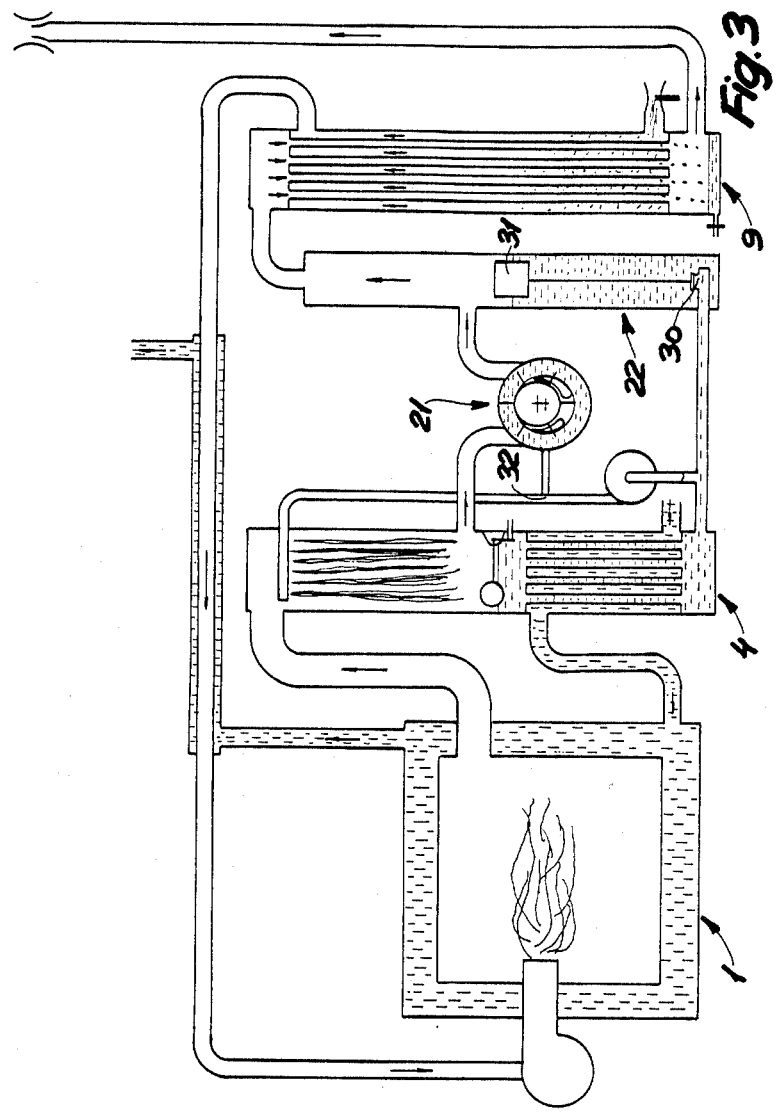

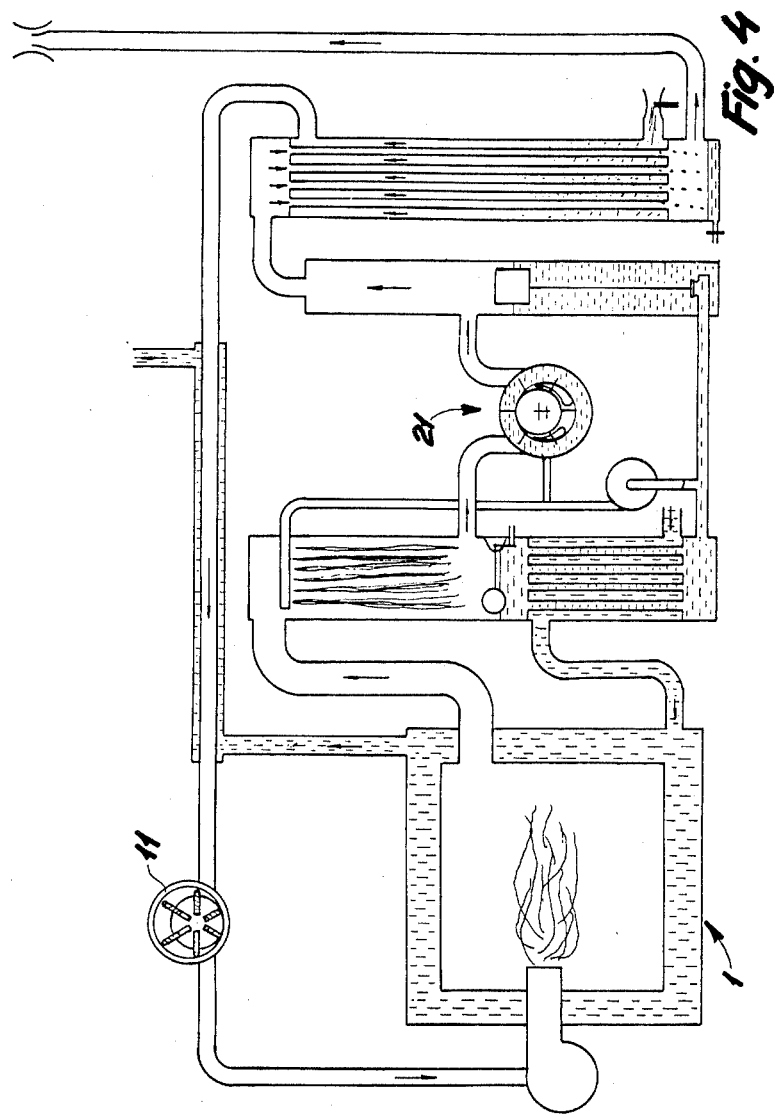

METHOD IN THE OPERATION OF A FIRING PLANT, AND A FIRING PLANT FOR PERFORMING THE METHOD

The invention concerns a method in the operation of a firing plant of the type comprising a combustion furnace and heat exchanger means for the transfer of thermal energy from the flue gas of the furnace to its combustion air. Such an art was described as early as in the U.S. Pat. No. 1,741,567.

Later on it has repeatedly been attempted to make the method more efficient by cooling the flue gas so much that a great portion of the water vapour as well as gaseous combustion products condense and give off condensation heat to a heat exchanger. The process of condensation provides several advantages, such as the possibility of firing moist, solid fuel, and firing with a large excess of air without any increase in chimney losses, and that uninsulated flues, etc. can be used. These advantages get more pronounced with increased cooling of the flue gas, and in the vast majority of known plants the lowest flue gas temperature is slightly greater than the return water temperature of the firing plant.

The French Patent Appln. 7 900 901 teaches the addition of water to the intake air to the furnace, which causes a drop in temperature because of the evaporation of the water, and it is possible additionally to cool the flue gas somewhat over the above-mentioned prior art by bringing the flue gas into heat exchanging relationship with the evaporation zone.

The object of the invention is to provide a method in the operation of a firing plant of the last-mentioned type, which provides an additional improvement in the firing economy and an additional reduction in the air pollution caused by the firing plant.

The object is achieved by reducing the combustion air pressure in the first portion of the heat exchanger so that the first portion of the heat exchanger serves as a low pressure evaporator for the said liquid, since a considerable reduction in the pressure in the first portion of the heat exchanger, where the added liquid evaporates, results in accelerated evaporation of the liquid, causing the flue gases in the second portion of the heat exchanger to be cooled to a particularly low temperature so that the condensation heat can be utilized to a greater degree than before. When a large amount of water condenses from the flue gas, a greater proportion of soot particles will be bound to the water. Moreover, less water will be discharged through the flue so that also smells and other sources of pollution associated with the water drops in the flue gas are reduced. The effective evaporation of the liquid provides a large variation range for the amount of added liquid, and therefore there is no difficulty in dissolving a sufficient amount of additives in accordance with claim 2, providing for even dispersion of the additives in the flame itself.

When the method of claim 1 is carried out in combination with the art, known per se, of claim 3, quite special and advantageous working conditions are obtained, where the pressure conditions in the plant correspond to what is known from the heat pump technique, with the added liquid serving as the coolant of the heat pump, and the air circulating through the plant serving as the coolant carrier. More particularly, the low pressure in the low pressure portion of the heat exchanger causes accelerated evaporation as known from the evaporator of the heat pump systems, while the high pressure, which involves effective condensation of the coolant, can in principle be compared to the pressure conditions in the condenser of the heat pump systems.

The pressure conditions can be established in several ways, but require at least the presence of a pump and a predetermined dimensioning of the resistance to air flow through the plant. The use of several pumps gives more freedom in the determination of the pressure conditions in the plant, and it is therefore possible to predetermine the pressure, e.g. in the furnace, as stated in claim 4. This may be of importance as it is an advantage that a plant for performing the method can be installed on an existing furnace, where the boiler is intended to be operated at atmospheric pressure, but there may conceivably be cases where an absolute negative pressure is desired in the furnace to ensure that no gases will leak out, and it may even be preferred in special cases to have a positive pressure in the furnace. The combustion air to the furnace will thus contain large amounts of vapour, mainly water vapour, and to avoid unintentional condensation of this water vapour the method is preferably carried out as stated in claim 5, the superheating energy being taken from the firing plant, which does not affect the net firing economy. The flue gas is preferably compressed by a liquid ring pump, which may be fitted in various ways after the furnace, and which involves the quite special advantage that the flue gas may be allowed to condense in this pump, this totally obviating problems of hammering.

The invention also concerns a firing plant for use in the method, said firing plant being characterized by pressure reducing means provided between the first portion of the heat exchanger and the discharge opening to reduce the combustion air pressure in the first portion of the heat exchanger in which said liquid evaporates. The pressure reducing means are so dimensioned with respect to the first portion of the heat exchanger as to provide a predetermined reduction in pressure for accelerated evaporation of the liquid, which is preferably water. The water is preferably added by the means stated in claim 8, which are very simple and reliably utilize the negative pressure in the first portion of the heat exchanger. In order that the method may be carried out as stated in claim 3, the pressure reducing means may be designed as stated in claim 9, or the compression means of claim 10 may be used, which are dimensioned in dependence upon the pressure drop through the second portion of the heat exchanger and the flue to provide a predetermined positive pressure in the second portion of the heat exchanger. The condensation will thus be accelerated, partly because of the positive pressure and partly because the accelerated evaporation of liquid in the combustion air brings about a very low flue gas temperature.

As mentioned earlier, a single pump will suffice for the provision of the desired pressure conditions. If the pump is mounted in front of the furnace, the pump may typically be a rotary pump, as stated in claim 11. The rotary pump produces a pressure increase which may cause undesirable condensation of the liquid added to the combustion air before the air arrives to the furnace; this may be obviated by the heat exchanger means of claim 12 which serve to superheat the combustion air. A liquid ring pump might also be used between the first portion of the heat exchanger and the furnace, and in that case the heat exchanger means of claim 12 will be placed between the pump and the furnace to evaporate water drops ejected by the liquid ring pump.

However, a liquid ring pump lends itself particularly well to installation after the furnace, as stated in claim 13. The reason is that the liquid ring pump has the special advantage of being insensitive to hammering because the condensates separated in the pump are accommodated in the liquid ring forming part of a circulation circuit for the pump in a known manner. The latter circulation circuit may be in heat exchanging relationship with the firing plant or another heat consuming object, cf. the features stated in claim 14.

Preferably, as stated in claim 15, flue gas washer means known per se are positioned between the furnace and the liquid ring pump so that the flue gas is cooled and cleaned before entering the liquid ring pump. Then the pump will transport fewer kilogrammes of water and fewer liters of air so that it consumes less waste power. As a water circuit will typically be involved, the liquid ring pump will be called water ring pump in the following.

It will be appeciated that the plant may comprise several pumps and/or flue gas washer means depending upon whether it will be economically worth while making the control of the plant more sophisticated with respect to its capacity. The control is no part of the invention, but it will be appreciated that e.g. the flow resistance through the stated inlet and discharge openings may be adjustable in accordance with the pump power and in dependence upon the amount of fuel consumed per unit of time.

Figure 2:
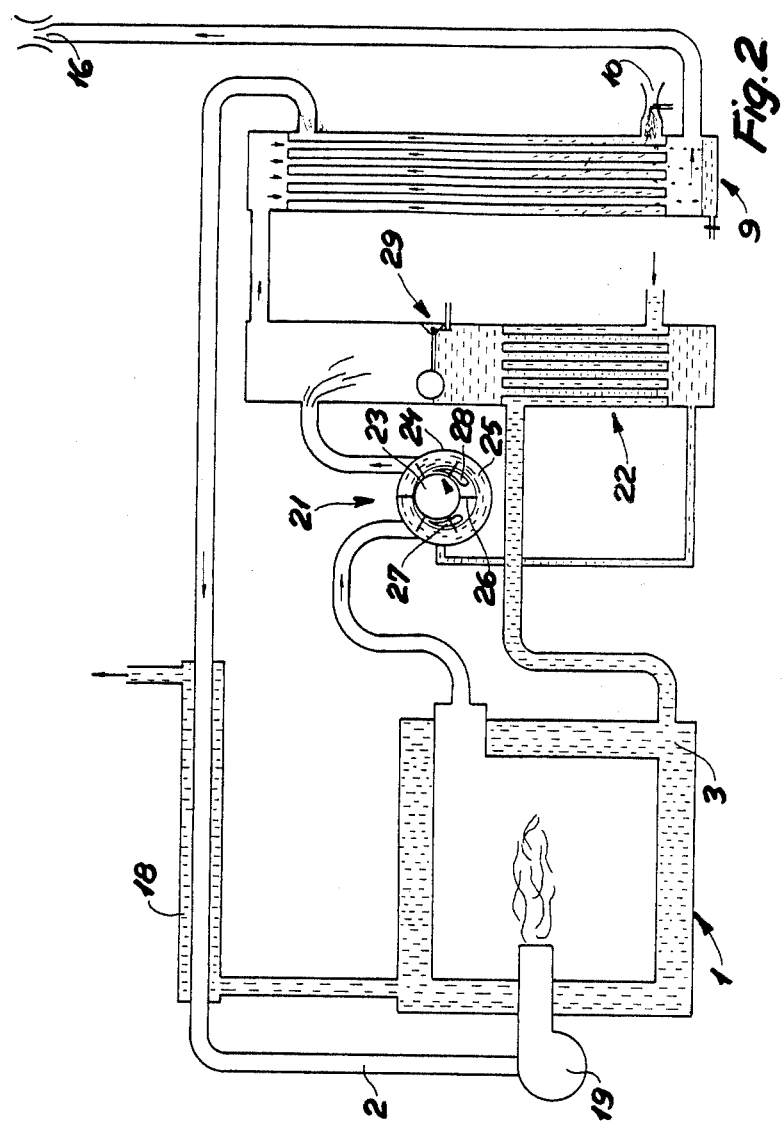

The invention will be explained more fully by the following description of some embodiments with reference to the drawing, in which FIG. 1 shows a first embodiment of a plant according to the invention, while FIGS. 2–4 show modified embodiments of the plant according to the invention.

The firing plant shown in FIG. 1 comprises a furnace 1 which receives combustion air through a duct 2. The generated thermal energy is given off partly to a circulating heating medium 3 and is partly contained in the flue gas passing from the furnace through a duct 5 into a flue gas washer 4. Flue gas washers are known per se, and it will therefore be readily understood that another medium 6 is circulated by means of a pump 7 to create a mist of liquid in the upper part of the flue gas washer, which provides effective cooling of the flue gas and suspension of soot particles in the medium 6, so that the flue gas is both cooled and cleaned before passing through a duct 8 to an additional heat exchanger 9. It appears that the heating medium 3 flows through a heat exchanger disposed in the lower portion of the flue gas washer 4 so that the thermal energy is transferred to this heating medium. Usually, the heat exchanger at the bottom of the flue gas washer is connected to e.g. the return line of a radiator system so that the flue gas temperature in the duct 8 is slightly greater than the return temperature of the radiator system.

However, one of the objects of the invention is to obtain a significantly lower flue gas temperature before the flue gas is discharged to the atmosphere.

The additional cooling of the flue gas is provided in the heat exchanger 9. As mentioned earlier, it is not unknown to transfer thermal energy from the flue gas to the combustion air, but, according to the invention, a significantly more efficient heat transfer and thus colder flue gas is obtained by the creation of a negative pressure in the portion of the exchanger 9 where vaporizable liquid evaporates in the combustion air. More particularly, the combustion air is drawn in through a narrow duct 10 by means of a pump 11, which, in the shown embodiment, is a generally known rotary pump. The flow resistance of the duct 10 and the characteristics of the pump are so adapted that the pressure in the portion 12 of the heat exchanger 9, where the liquid evaporates, is considerably reduced with respect to the atmospheric pressure. The vaporizable liquid, called water in the foregoing, is supplied through a nozzle 13 which terminates in the narrow duct 10 so that the liquid is supplied according to the same principle as in a carburetter. The low pressure in the heat exchanger portion 12 causes accelerated evaporation of liquid in the combustion air, resulting in a very low temperature for additional cooling of the flue gas which flows from above and down through a heat exchanger portion 14 before being discharged to the atmosphere through a flue 15.

In the embodiment shown, the flue 15 terminates in a narrow opening 16, which causes such a great pressure drop that the flue gas pressure in the heat exchanger portion 14 is noticeably higher than the atmospheric pressure, thus accelerating, in a known manner, the condensation of the flue gas (condensates may be discharged through an outlet 17 in the bottom of the heat exchanger 9). It will then be readily understood that the system shown in FIG. 1 operates like an ordinary heat pump system, which explains the unsurpassed efficiency over the prior art. A comparison is made with the heat pump system because the combustion air drawn in through the duct 10 serves as a carrier for a coolant in the form of the water from the nozzle 13, and the rotary pump 11, which serves as a compressor, creates a low pressure in the heat exchanger portion 12, which thus serves as the evaporator of a heat pump system. The corresponding condensator is formed by the heat exchanger porton 14, so that the temperature levels of the combustion air and flue gas temperature levels are "artificially" pumped to levels which cause an unprecedented low flue gas discharge temperature with the consequent high efficiency of the firing plant.

In the embodiment of FIG. 1 a pressure increase will take place through the pump 11, which involves the risk of the liquid vapour in the combustion air condensing between the pump 11 and the furnace 1. This is avoided by means of a jacket type heat exchanger 18 through which the heated medium 3 flows so that the combustion air is superheated. The thermal energy spent on this is not lost as it is passed directly to the furnace together with the combustion air.

The reference numeral 19 symbolizes a burner which may correspond to a known oil burner with an associated blower. Owing to the pressure conditions described, the blower can easily be omitted so that an oil injection nozzle will be sufficient. On the other hand, owing to the effective condensation of the flue gas, the system of the invention is particularly suitable for the firing of moist solid fuel, such as straw or wood chips, and in such cases the reference numeral 19 should be taken to include feed means for such fuels.

According to the invention, neutralizing and/or catalyzing additives may be added to the water which is introduced through the nozzle 13. Such additives may be intended for neutralizing the sulfate combustion products and/or serving as catalysts for the conversion of the combustion products to substances easily separable from the medium 6. As the additives are effectively dispersed in the flame of the furnace, an even and complete neutralization is obtained so that very few acid residues will be left in the flue gas. To additionally protect the heat exchanger 9 against corrosion, the flue gas is conducted from above and downwards, as mentioned earlier; this flow direction can easily be provided because of the positive pressure in the heat exchanger portion 14 in connection with the discharge of the flue gas at 16. When the flue gas is discharged, it expands, and in connection with guide plates 20 it is rapidly dispersed in a large volume of air so that "acid showers" are excluded.

FIG. 2 shows another embodiment of the plant of the invention where the parts whose mode of operation corresponds to what is explained in connection with FIG. 1 have the same reference numerals as in FIG. 1. The essential difference between the embodiment of FIG. 1 and the embodiment of FIG. 2 is that to the end of providing the desired pressure conditions in the heat exchanger 9 the pump is positioned in the flue and consists of a water ring pump 21 with an associated by-pass container 22. Correct dimensioning of the throttle means 10, 16 and of the pump characteristics provides the desired working conditions, e.g. as described in the preceding paragraph. Because of the location of the pump 21, the superheater 18 is not strictly necessary but is still preferred so that local cooling in the duct 2 does not give rise to condensation of the added water vapor. The changed location of the pump also means that a negative pressure exists in the furnace of FIG. 2.

The principle of a water ring pump is known and will therefore just be explained briefly. A rotor 23 is driven eccentrically in the direction of the arrow in a rotor housing 24, the centrifugal force creating a rotary liquid ring 25, preferably water, so that expanding and contracting chambers are formed between the water ring and rotor blades 26, said chambers communicating with an inlet opening 27 and a discharge opening 28 for flue gas, respectively. In this embodiment the water ring 21 serves both as a flue gas washer and a primary flue gas cooler. Excess pump water, which is heated and has absorbed soot particles, are ejected into the by-pass container 22, whose bottom accommodates a heat exchanger for the heating medium 3 like the heat exchanger in the bottom of the flue gas washer 4 in FIG. 1. Owing to the flue gas condensate, the amount of liquid in the by-pass container 22 continues to increase, and an overflow valve 29 is therefore provided (this valve is also present in FIG. 1 for the same reason).

A water ring pump offers several advantages when used for this special purpose. First, it can create a pressure difference which is sufficient for the invention, and secondly it is insensitive to hammering which destroys must compressors when a mixture of liquid and gas is employed. Finally, the powerful turbulence provides an efficient heat exchange between the flue gas and the water ring as well as the excess water which is ejected into the container 22. On the other hand, the water ring pump has a slightly lower efficiency than ordinary compressor because of the mechanical losses in the liquid transport. However, these losses may be reduced, e.g by means of the embodiment shown in FIG. 3.

The embodiment of FIG. 3, too, contains parts which have been described in the foregoing and are therefore given the same reference numerals. The embodiment of FIG. 3 differs from the one explained in connection with FIG. 2 by the provision between the furnace 1 and the water ring pump 21 of a flue gas washer 4 of the same type as the one shown in FIG. 1, which was also designated by 4. The advantage of inserting the flue gas washer 4 in FIG. 3 is that the flue gas is cooled and cleaned considerably before being drawn into the water ring pump 21. Then, with respect to before, the water ring pump will rotate fewer solid particles, and it will convey fewer liters of flue gas per unit of time so that the losses in the water ring pump in FIG. 3 are lower than they would have been in the embodiment shown in FIG. 2. In FIG. 3 the by-pass container 22 of the water ring pump is connected to the flue gas washer 4 through a valve 30 controlled by a float 31. This arrangement is necessary because of the pressure difference between the flue gas washer and the by-pass container, as caused by the water ring pump 21. The supply of liquid to the water ring is taken from a T-member 32 on the riser pipe to the top of the flue gas washer 4.

In association with the embodiment shown in FIG. 3, an example will be given of some working conditions in the firing plant, it being supposed that combustion air is drawn in at 10 with 4° C. and 80% relative humidity. With a 25% excess of air, the enthalpy will be about 69 kcal per kg of burned oil. About 620 g of water per kg of burned oil are added in the heat exchanger 9, and the air and water mixture is heated in the heat exchanger to about 30° C., causing all the added water to convert to vapour phase as the pressure in the heat exchanger 9 is e.g. 0.6 atmosphere. The enthalpy of the intake air is now about 600 kcal per kg of burned oil. A pressure of e.g. 1.4 atmospheres is obtained in the heat exchanger portion 12 by means of the pump 21, and it is assumed that the flue gas passed to the heat exchanger portion 12 has a temperature of 45° C. and a water content of about 850 g per kg of unburned oil corresponding to an enthalpy of about 680 kcal per kg of burned oil. The flue gas leaving the heat exchanger 9 typically has a temperature of 14° C. and a water vapour content of 125 g of water per kg of burned oil (which is about one tenth of the water content in normal flue gases) and an enthalpy of about 130 kcal per kg of burned oil. With these numerical examples the efficiency of the firing plant will be between 99 and 100% of the upper calorific value. When the flue gas expands in the atmosphere, its relative humidity falls from 100% to about 75%.

The embodiment of FIG. 4 differs from the embodiment of FIG. 3 only by the provision of two pumps, viz. the water ring pump 21 and a rotary pump 11 which was mentioned in connection with FIG. 1. The use of two pumps of course provides a greater drive effect and greater pressure differences, but also more freedom with respect to the distribution of pressure through the firing plant. The plant may e.g. be so designed that the absolute pressure in the furnace 1 is approximately equal to the atmospheric pressure so that an ordinary existing furnace may easily be provided with the above-mentioned means for the achievement of the great efficiency which is characteistic of the plant, also when energy losses in the additional pump or pumps are taken into consideration.

I claim:

1. A method in the operation of a firing plant of the type comprising a combustion furnace and heat exchanger means which at least comprise a heat exchanger with a first portion through which the combustion air flows, and a second portion which is separated from the first portion and through which the flue gas flows for transfer of thermal energy from the flue gas of the furnace to the combustion air, wherein a vaporizable liquid is added to the combustion air, characterized by reducing the combustion air pressure in the first portion of the heat exchanger to sufficiently below atmospheric pressure so that the first portion of the heat exchanger serves as a low pressure evaporator for the said liquid.

2. A method according to claim 1, characterized by admixing the liquid with additives resulting in readily separable combustion products during combustion.

3. A method according to claim 1, characterized by increasing the flue gas pressure in the second portion of the heat exchanger to above atmospheric pressure so that the second heat exchanger portion serves as a high pressure condenser for the flue gas.

4. A method according to claims 1 or 3, characterized by establishing the said pressure conditions so that the pressure in the combustion furnace is adjustable with respect to the pressure of the surroundings.

5. A method according to claim 1, 2 or 3 characterized by superheating the wetted combustion air.

6. A method according to claim 3, characterized by using a liquid ring pump to compress the flue gas.

7. A firing plant for performing the method of claim 1 and comprising a combustion furnace, a gas flow duct system including an inlet opening and a discharge opening for combustion gas and flue gas, respectively, heat exchanger means in said gas flow duct system and comprising at least a heat exchanger with a first portion connected between the inlet opening and said combustion furnace, and a second portion separated from the first portion and connected between the discharge opening and the furnace, and means for adding a liquid to the combustion air admitted into said gas flow duct system via the inlet opening, said heat exchanger being operable to transfer thermal energy from the flue gas to the combustion air, partly because the liquid added to the combustion air evaporates in the combustion air and condenses in the flue gas, characterized by air pump means comprising a suction inlet in the direction of the first portion of the heat exchanger to reduce the combustion air pressure in the first portion of the heat exchanger to sufficiently below atmospheric pressure to enhance the evaporation of said liquid, and further comprising a pressure outlet in the direction of the second portion of the heat exchanger.

8. A plant according to claim 7, characterized by a venturi duct disposed between the inlet opening and the first portion of the heat exchanger and containing a nozzle to discharge the liquid.

9. A plant according to claim 7, characterized in that the air pump means are placed between the first and second portions of the heat exchanger and are designed to generate a positive pressure in the second portion of the heat exchanger.

10. A plant according to claim 7, characterized by air pump means provided between the furnace and the second portion of the heat exchanger to increase the flue gas pressure in the second portion of the heat exchanger in which the flue gas condenses.

11. A plant according to claim 7 or 9, characterized in that the air pump means comprises a rotary pump which is placed between the first portion of the heat exchanger and the furnace.

12. A plant according to claim 7, characterized in that additional heat exchanger means are provided between the first portion of the heat exchanger and the furnace to superheat the combustion air.

13. A plant according to any of claims 7–10 and 12, characterized by a liquid ring pump disposed between the furnace and the second portion of the heat exchanger.

14. A plant according to claim 13, characterized by additional heat exchanger means through which the ring pump liquid and circulation water, respectively, flow to distribute thermal energy from the plant.

15. A plant according to claim 13, characterized in that flue gas washer means known per se are provided between the furnace and the inlet opening of the liquid ring pump.

* * * * *